UNITED STATES PATENT OFFICE 2,305,690

ANTHRAQUINONE DERIVATIVES AND PROCESS OF MAKING SAME

Paul Grossmann, Binningen, Switzerland, assignor to the firm Society of Chemical Industry in Basle, Basel, Switzerland No Drawing. Application August 27, 1940, Serial No. 354,448. In Switzerland September 12, 1939

16 Claims. (Cl. 260—376)

It is an object of the present invention to provide for new and valuable anthraquinone derivatives.

It is a further object to provide new products which are, in the form of their salts, especially alkali salts, soluble in water and are suitable for dyeing cellulose derivatives, such as cellulose esters and ethers, for instance acetate rayon, from aqueous solutions in strong and fast tints, for instance violet, blue and blue green tints.

It is a further object to provide a process for producing these new products.

Further objects will partly be obvious and will partly appear hereinafter.

These objects are accomplished by anthraquinone derivatives containing at least two primary amino groups and once the grouping

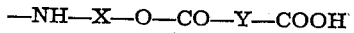

wherein X and Y stand for an aliphatic or an aromatic radical. They may for instance be obtained by reacting an aminoanthraquinone containing at least three primary amino groups with compounds of the general formula halogen—X—O—CO—Y—COOH wherein X and Y have the meaning given above, or with compounds of the general formula

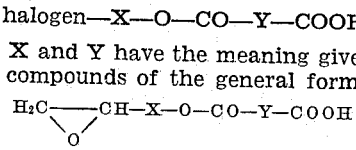

care being taken that only one amino group of the aminoanthraquinone enters into reaction.

Aminoanthraquinones containing at least three primary amino groups and serving as starting material for the present process are for instance 1:4:5:8-tetraminoanthraquinone and its isomers as well as those tetraminoanthraquinones in which one amino group is substituted by an alkyl or an aryl radical such as a methyl-, propyl-, isopropyl-, butyl-, isobutyl- or a phenyl radical, which may itself contain substituents. Further starting materials are for instance triaminoanthraquinones such as 1:4:5- and 1:4:6-triaminoanthraquinone which may contain further substituents such as hydroxyl groups. Those aminoanthraquinones are preferred which contain all amino groups directly attached to the anthraquinone nucleus but also those are to be considered which contain at least two amino groups attached to the anthraquinone nucleus and, for instance, a further amino group attached to an external radical, such as a phenyl radical, bound, for instance as phenylamino group to the anthraquinone radical.

Compounds of the general formula

or

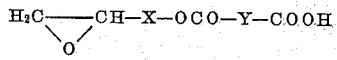

given above may be obtained, for instance, by reacting halogen hydrins or glycides such as 2-chloroethanol(-1), 3-chloropropanol(-1), 4-chlorobutanol(-1), 3 - chloro - 2 - hydroxypropanol(-1) with aromatic or aliphatic saturated or unsaturated carboxylic acids containing at least two carboxyl groups and especially with the anhydrides thereof. Such di- and polycarboxylic acids are, for instance, maleic acid, succinic acid, citric acid, phthalic acid, naphthalic acid and quinolinic acid.

The new anthraquinone derivatives may also be obtained by reacting aminoanthraquinones containing at least two primary amino groups and a substituent capable of being replaced with compounds of the general formula

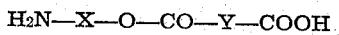

wherein X and Y have the same meaning as above. Such aminoanthraquinones are for instance those diamino or triaminoanthraquinones which contain an alkoxy (such as methoxy or ethoxy) group or a halogen atom such as chlorine or bromine. These aminoanthraquinones may thus be reacted for example with acid esters of aminoethanols and aminopropanols.

Further the new anthraquinone derivatives may be obtained by reacting aminoanthraquinones containing at least two primary amino groups and once the grouping

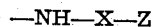

wherein X stands for a radical of the lower aliphatic series and Z stands for halogen or hydroxyl with polybasic acids such as given above or their salts or anhydrides.

Finally the new anthraquinone derivatives may be prepared by starting from the leuco compounds of the above named aminoanthraquinones instead of the aminoanthraquinones themselves. There may be some advantage in this method when an amino or hydroxyl group is to be exchanged.

All these reactions may be carried out according to their character in an aqueous medium or in organic solvents or diluents. Agents promoting the reaction can be added such as copper or copper salts. If hydrogen halide is liberated during the reaction acid binding agents are added advantageously such as sodium carbonate or acetate.

In all the reactions where polyaminoanthraquinones are reacted with compounds of the general formula

halogen—X—O—CO—Y—COOH given above where there is the possibility of more than one amino group entering into reaction the conditions must be chosen so that only one amino group is affected. This may be achieved by suitable proportions of the components, suitable concentration of the components in the reaction mixture and suitable choice of reaction time and temperature. In any way it seems to be impossible to carry out these reactions until no substantial proportion of starting material is present without affecting substantially more than one amino group and an important feature of these reactions is therefore their incompleteness. Since any unreacted anthraquinone derivative (which is the expensive constituent) can be recovered by filtration, whereas the part which has undergone reaction, is soluble in water, and can easily be obtained from the resulting aqueous solution, no substantial loss is occurred by not carrying out the reaction completely.

In all these reactions organic solvents of relatively high boiling point such as nitrobenzene or especially phenols (this term including cresols) have proved very useful.

The products of the present invention are of great value because they are soluble in water and at the same time suitable for dyeing acetate rayon, whereas most of the acetate rayon dyestuffs nowadays in use are insoluble in water and have to be dyed from an aqueous suspension.

Applicant is aware that it has previously been proposed to manufacture anthraquinone derivatives containing similar substituents as those of the present invention. The products of the present invention, however, which contain at least two primary amino groups and only one substituent lending solubility in water, possess the surprising property of having superior affinity for acetate rayon and therefore yield very intense dyeings.

*Example 1*

13.5 parts of 1:4:5:8-tetraminoanthraquinone are heated in 40 parts of crude cresol together with 8 parts of potassium acetate, 0.1 part of copper acetate and 13 parts of succinic acid-mono-β-chlorethyl ester for 2 to 3 hours at 120° C. The cresol is separated by addition of alcohol and filtration, or by steam distillation, and the dyestuff remaining is dissolved in dilute ammonia, filtered from unchanged parent materials which are insoluble in water, precipitated by means of sodium bisulphite, and dried in vacuo.

The dyestuff obtained is a dark coloured powder of the probable formula

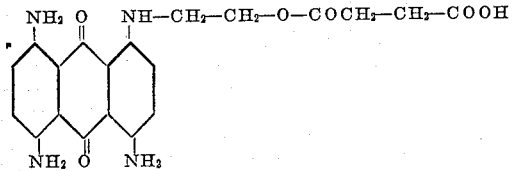

which dissolves in dilute alkali to form a blue solution and which dyes acetate rayon in strong blue tones with good fastness properties when applied from weakly acid baths, for instance acid with sodium bisulfite, or baths containing salt.

An analogous process may be carried out by starting with the γ-chloro-β-hydroxypropyl monoester of succinic acid.

In place of the acid ester of succinic acid, those of maleic acid, citric acid, phthalic acid, naphthalic acid, quinolinic acid, etc. may be used.

Instead of cresol, o-dichlorobenzene, nitrobenzene, dimethylaniline, or glacial acetic acid may be used as solvent. The condensation may also be carried out without the addition of copper.

Instead of 1:4:5:8-tetraminoanthaquinone, the isomers, for example, 1:4:5:6- or 1:4:5:7-tetraminoanthraquinone, or, in the same manner, 1:4:5-triamino- or 1:4:5-triamino-8-hydroxyanthraquinone may be used.

*Example 2*

13.5 parts of 1:4:5:8-tetraminoanthraquinone are suspended, together with 8 parts of potassium acetate, in 40 parts of crude cresol. A cooled solution of maleic acid mono-β-chlorethyl ester, obtained by heating 7.4 parts of maleic acid anhydride with 6 parts of β-chlorethyl alcohol in about 10 parts of dimethylaniline to 100° C., is added, and the mixture is heated for about 1½ hours to 120° C. The cresol and the dimethylaniline are then driven off by steam, and the dyestuff is dissolved by addition of ammonia and undissolved parent substance is removed by filtration. The dyestuff is then precipitated from the solution obtained by addition of sodium bisulphite and is dried in vacuo.

The dyestuff thus prepared is a dark coloured powder of the probable formula

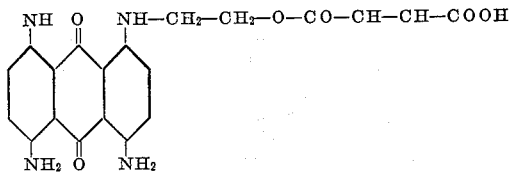

It dissolves in dilute alkalies to yield a blue solution and dyes acetate rayon from weakly acid or salt containing dyebaths in strong blue shades which have good fastness properties.

*Example 3*

18 parts of 1:4:5-triamino-8-(4'-aminophenyl)-aminoanthraquinone are heated for 2–3 hours to 140–160° C. in 40 parts of nitrobenzene, together with 6 parts of sodium carbonate and 13 parts of succinic acid mono-γ-chloro-β-hydroxy-α-propyl ester. The dyestuff is isolated as described in Example 1.

The dyestuff, which has the probable formula

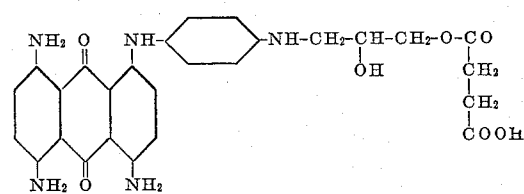

dissolves in dilute alkali with a blue green colour and dyes acetate rayon in fast, blue-green shades.

*Example 4*

6.3 parts of 1:8-diamino-4-hydroxy-5-β-hydroxyethylamino-antraquinone are heated in 25 parts of pyridine together with 2.5 parts of succinic acid anhydride to 120° C. The reaction mixture is poured into water, the aqueous mixture filtered, if necessary, to remove insoluble impurities and the dyestuff is precipitated by careful acidification.

The dyestuff, which is of the probable formula

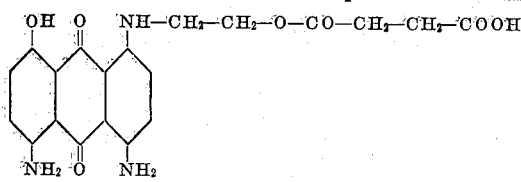

dissolves in dilute alkalies with a green-blue colouration and dyes acetate rayon in fast, green-blue shades.

The succinic acid anhydride may be replaced by the anhydrides of the acids named in Example 1.

Instead of pyridine, other tertiary bases may be used as solvent.

*Example 5*

3.6 parts of 1:4:5-triamino-8-(α-chloro-β-hydroxypropyl)-aminoanthraquinone are heated for some hours at 120–140° C. in a mixture of 50 parts of acetone and 50 parts of a solution of 2.5 parts of succinic acid in water which has been made neutral to litmus. The acetone is distilled away, the dyestuff dissolved in dilute ammonia and undissolved matter is removed by filtration. The dyestuff is then precipitated by means of acetic acid.

It has the probable formula

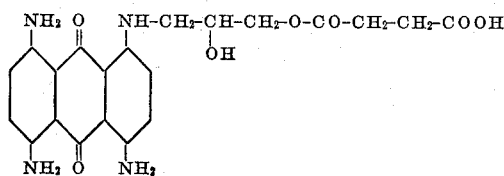

and dissolves in dilute ammonia to form a blue solution. It dyes acetate rayon in fast blue shades from weakly acid dyebaths or from baths containing salt.

*Example 6*

1 part of the dyestuff obtained according to Example 1, paragraph 1, is dissolved in 200 parts of water. 60 parts of this solution are diluted to form 300 parts. In this dyebath, 10 parts of acetate rayon are dyed for 1½ hours at 80° C., under addition of 30% of Glauber salt, after which the acetate rayon is rinsed with warm water and dried. It is dyed in a fast, deep blue shade.

What I claim is:

1. Anthraquinone compounds containing a single nucleus of the group consisting of anthraquinone and hydroxyanthraquinone nuclei, containing at least two primary amino groups directly attached to the said nucleus and containing once the grouping

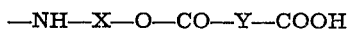

directly attached to the said nucleus, wherein X stands for a radical of the lower aliphatic series and Y stands for a member of the group consisting of aliphatic and aromatic radicals free from cyclic bound carbonyl groups, said nucleus being free from other substituents.

2. Anthraquinone compounds containing a single nucleus of the group consisting of anthraquinone and hydroxyanthraquinone nuclei, containing at least two primary amino groups directly attached to the said nucleus and containing once the grouping

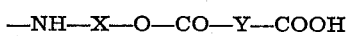

directly attached to the said nucleus, wherein X and Y stand for a radical of the lower aliphatic series, said nucleus being free from other substituents.

3. Anthraquinone compounds containing a single anthraquinone nucleus, containing at least two primary amino groups directly attached to the said nucleus, and containing once the grouping

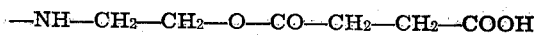

directly attached to carbon, said nucleus being free from other substituents.

4. Anthraquinone compounds containing a single anthraquinone nucleus, containing at least two primary amino groups directly attached to the said nucleus, and containing once the grouping

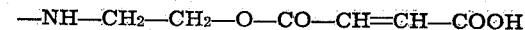

directly attached to carbon, said nucleus being free from other substituents.

5. Anthraquinone compounds containing a single anthraquinone nucleus, containing at least two primary amino groups directly attached to the said nucleus, and containing once the grouping

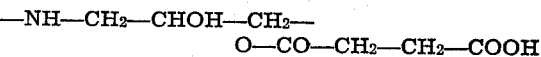

directly attached to carbon, said nucleus being free from other substituents.

6. The product of the formula

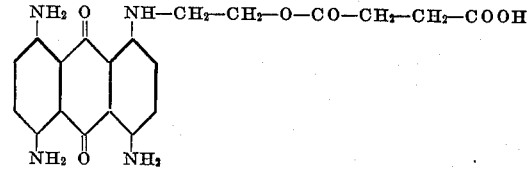

7. The product of the formula

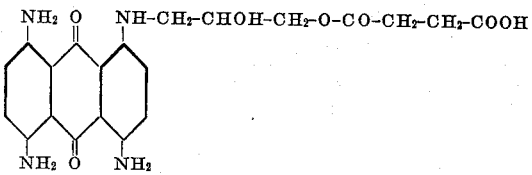

8. The product of the formula

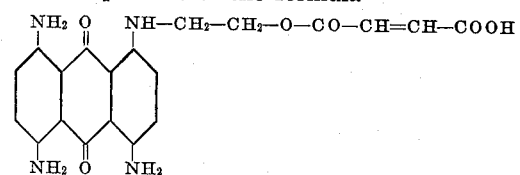

9. A process of the character described which comprises reacting a compound containing a single nucleus of the group consisting of anthraquinone and hydroxy-anthraquinone nuclei carrying at least three primary amino groups directly attached to the said nucleus and being free from other nuclear substituents with a compound of the general formula

wherein hal stands for a halogen and X and Y stand for a radical of the lower aliphatic series only to such an extent that unreacted anthraquinone starting material is still present.

10. A process of the character described which comprises reacting a compound containing a single nucleus of the group consisting of anthraquinone and hydroxy-anthraquinone nuclei carrying at least three primary amino groups directly attached to the said nucleus and being free from other nuclear substituents with a compound of the general formula Cl—X—OCO—Y—COOH wherein X and Y stand for a radical of the lower aliphatic series only to such an extent that unreacted anthraquinone starting material is still present.

11. A process of the character described which comprises reacting a tetramino-anthraquinone which is free from other nuclear substituents with succinic acid monoester of β-chloroethylalcohol only to such an extent that unreacted anthraquinone starting material is still present.

12. A process of the character described which comprises reacting a tetramino-anthraquinone which is free from other nuclear substituents with succinic acid monoester of γ-chloro-β-oxypropylalcohol only to such an extent that unreacted anthraquinone starting material is still present.

13. A process of the character described which comprises reacting a tetramino-anthraquinone which is free from other nuclear substituents with maleic acid monoester of β-chloroethylalcohol only to such an extent that unreacted anthraquinone starting material is still present.

14. A process of the character described which comprises reacting a 1:4:5:8-tetraminoanthraquinone which is free from other nuclear substituents with succinic acid monoester of β-chloroethylalcohol only to such an extent that unreacted anthraquinone starting material is still present.

15. A process of the character described which comprises reacting a 1:4:5:8-tetraminoanthraquinone which is free from other nuclear substituents with succinic acid monoester of γ-chloro-β-oxypropylalcohol only to such an extent that unreacted anthraquinone starting material is still present.

16. A process of the character described which comprises reacting a 1:4:5:8-tetraminoanthraquinone which is free from other nuclear substituents with maleic acid monoester of β-chloroethylalcohol only to such an extent that unreacted anthraquinone starting material is still present.

PAUL GROSSMANN.